United States Patent [19]
Mathews et al.

[11] Patent Number: 5,398,244
[45] Date of Patent: Mar. 14, 1995

[54] METHOD AND APPARATUS FOR REDUCED LATENCY IN HOLD BUS CYCLES

[75] Inventors: Gregory S. Mathews, Santa Clara; Deepak J. Aatresh, Sunnyvale; Sanjay Jain, Santa Clara, all of Calif.

[73] Assignee: Intel Corporation, Santa Clara, Calif.

[21] Appl. No.: 92,488

[22] Filed: Jul. 16, 1993

[51] Int. Cl.[6] ............................................. H04J 3/00
[52] U.S. Cl. ................................. 370/85.6; 340/825.5
[58] Field of Search ................... 370/60, 94.1, 85.1, 370/85.6, 85.2, 85.8; 340/825.5, 825.51

[56] References Cited

U.S. PATENT DOCUMENTS

| | | | |
|---|---|---|---|
| 4,623,886 | 11/1986 | Livingston | 370/85.2 |
| 4,818,985 | 4/1989 | Ikeda | 370/85.2 |
| 5,276,684 | 1/1994 | Pearson | 370/85.1 |
| 5,287,481 | 2/1994 | Lin | 395/425 |

*Primary Examiner*—Douglas W. Olms
*Assistant Examiner*—Shick Hom
*Attorney, Agent, or Firm*—Blakely, Sokoloff, Taylor & Zafman

[57] ABSTRACT

An innovative protocol and system for implementing the same enables quick release of the bus by the master device, such as a CPU, to permit slave devices access to the bus. In one embodiment, the arbiter can select between the original hold protocol and quick hold protocol according to predetermined criteria which indicates that a low latency response is requested. Upon assertion of a QHOLD signal, the CPU issues a burst last signal to prematurely terminate outstanding burst transactions on the bus in a manner transparent to the slave devices. Once the outstanding bus cycles are complete, the CPU performs an internal backoff to immediately release the bus for access by the slave device requesting access. Any pending burst cycles which were terminated prematurely by the QHOLD signal, are subsequently restarted for the data not transacted by the CPU after the slave device completes access to the bus. The internal backoff mechanism is similarly transparent to the slave devices and does not cause a backoff signal to be issued to the peripherals or devices coupled to the bus. Thus, the addition of a quick hold protocol is added without significant modification of the slave devices' bus interface.

29 Claims, 6 Drawing Sheets

METHOD AND APPARATUS FOR REDUCED LATENCY IN HOLD BUS CYCLES

BACKGROUND OF THE INVENTION

1. Field of the Invention

The present invention relates to a method and apparatus for implementation of a dual hold protocol in a multiprocessor system. More particularly, the present invention relates to a method and apparatus for implementation of a quick hold protocol which enables slave processors to gain access to the bus more rapidly.

2. Art Background

In a microprocessor system, such as the one illustrated in block diagram form in FIG. 1, a plurality of devices are coupled via a bus 10. For example, there will be a CPU, which functions as the master device of the bus 15, as well as some slave devices 20 which can be co-processors, DMA devices or the like, memory 25 which is accessible by the devices coupled to the bus 15, 20 and an arbiter 30, which arbitrates device access to the bus. The master device 15 will by default have control of the bus 10 as well as highest priority of access to the bus 10. Therefore, the master 15 will maintain control of the bus 10 until asked to release the bus 10 to a device which requires access to the bus 10.

For example, in a system based upon an 80486 microprocessor, manufactured by Intel Corporation, Santa Clara, Calif., a hold protocol has been developed to enable slave devices to access the bus. Using the hold protocol, a slave device 20 will issue a bus request to the arbiter 30 to gain access to the bus. The arbiter will decide whether the device 20 has priority to access the bus, and if so, the arbiter 30 will assert a HOLD signal to the master 15. When the CPU is not utilizing the bus, it will monitor the HOLD signal and, when issued by the arbiter 30, the CPU will release the bus and assert a hold acknowledge (HLDA) signal to the arbiter 30. The arbiter then will issue a bus grant signal to the slave device 20 and the slave device will then access the bus. The master 15 will subsequently gain access when the slave device 20 releases the bus or when the master 15 issues a bus request to access the bus and the arbiter returns the bus to it.

The HOLD, HLDA and bus request signals form the hold protocol utilized. Typically, the master device 15 will poll the HOLD signal line during the boundary between bus cycles. A bus cycle is defined to be a number of clock cycles required for both the address and corresponding data transaction to occur. For example, if the CPU 15 issues a read request to memory 25, the address of the operation is first communicated across the bus 10 to memory 25. Memory 25 then responds by providing the data across the bus 10 to CPU 15. After the bus cycle in which the address is issued and the data transmitted is complete, the CPU checks the state of the HOLD signal to determine if there is an outstanding request to gain access to the bus. If a HOLD signal has been issued by the arbiter 30, the CPU 15 will issue a HLDA signal and release the bus for access by another device.

In order to increase the throughput of the microprocessor system, address pipelining has been developed. Examples of address pipelining are found in the i386 ™, i486 ™ SL, and Pentium ™ processors manufactured by Intel Corporation, Santa Clara, Calif. Address pipelining permits multiple addresses to be issued by the CPU without waiting for the corresponding data transaction to complete. Although this increases the efficiency of the microprocessor 15, the HOLD-HLDA protocol latency is extended because the CPU cannot relinquish the bus (and assert HLDA) until the data transactions for all outstanding addresses are completed (upon reception of a HOLD signal, the CPU ceases the issuance of new addresses).

Many microprocessors also provide for burst mode data transfer. Burst mode data transfers enable the transfer of multiple blocks of data in response to a single address issued. Thus, the bus cycle is complete when all blocks of data, responsive to the burst mode address issued, have been transmitted across the bus. As a transfer of multiple blocks of data requires more clock cycles than the transfer of a single block of data, higher latency in responding to hold requests is incurred during burst mode data transfers.

Latency is further introduced in systems which, for reasons such as power savings, divide down the clock frequency of operation. For example, if the clock frequency is divided in half, the latency incurred for determining whether an outstanding hold request exists is doubled. This latency problem is especially problematic when devices have time constraints which cannot be met due to the latency introduced by slower clock cycles and address pipelining. An example is a DMA device coupled to DRAM. The DRAM requires refresh periodically in order to maintain accurate states of data. The DMA must gain access to the bus within the maximum allotted time for refreshing the DRAM. However, it is quite possible with slower clock cycles and address pipelining, that the device will not gain access to the bus within the needed amount of time as the CPU does not process the hold request fast enough and the bus cycle boundaries where hold requests are processed are further apart.

SUMMARY OF THE INVENTION

It is therefore an object of the present invention to provide an alternate hold protocol and apparatus for implementing the same that decreases the latency for device access to the bus.

It is further an object of the present invention to provide a dual hold protocol which is selectable to accommodate high latency and low latency situations.

To meet latency issues which arise with the introduction of address pipelining and low power clock operations, a second hold protocol is provided which minimizes the impact of the latency which occurs. Using the quick hold protocol, the slave devices have priority over the master device and therefore gain access more quickly to the bus. When a QHOLD signal is asserted by an arbiter, the CPU will perform functions to shorten the bus cycle in order that the bus is quickly released for access by the slave device. In particular, if the bus cycles include burst operations, the CPU issues the BLAST# signal to notify the peripheral devices that the burst transmission is complete. The BLAST# signal is issued to prematurely terminate the burst transactions without affecting operation of peripheral devices. Subsequently, when the CPU has regained access to the bus, the CPU will initiate bus transactions for the data not transferred due to the premature termination of the bus transaction.

Furthermore, the QHOLD signal causes the CPU to internally perform a backoff from the bus. Control logic controls the backoff to occur once the bus cycle is complete such that state of the bus is ready for access by a slave device.

BRIEF DESCRIPTION OF THE DRAWINGS

The objects, features and advantages of the present invention will become apparent to one skilled in the art from the following detailed description in which.

DETAILED DESCRIPTION OF THE INVENTION

A method and apparatus for implementation of a dual hold protocol is described. In the following description, for purposes of explanation, numerous details are set forth, such as signal names, numbers of addresses and data lines, etc., in order to provide a thorough understanding of the preferred embodiment of the present invention. However, it will be apparent to one skilled in the art that the present invention may be practiced without these specific details. In addition, well known circuits have been shown in block diagram form, rather than in detail, in order to avoid unnecessarily obscuring the present invention.

Figure 1:
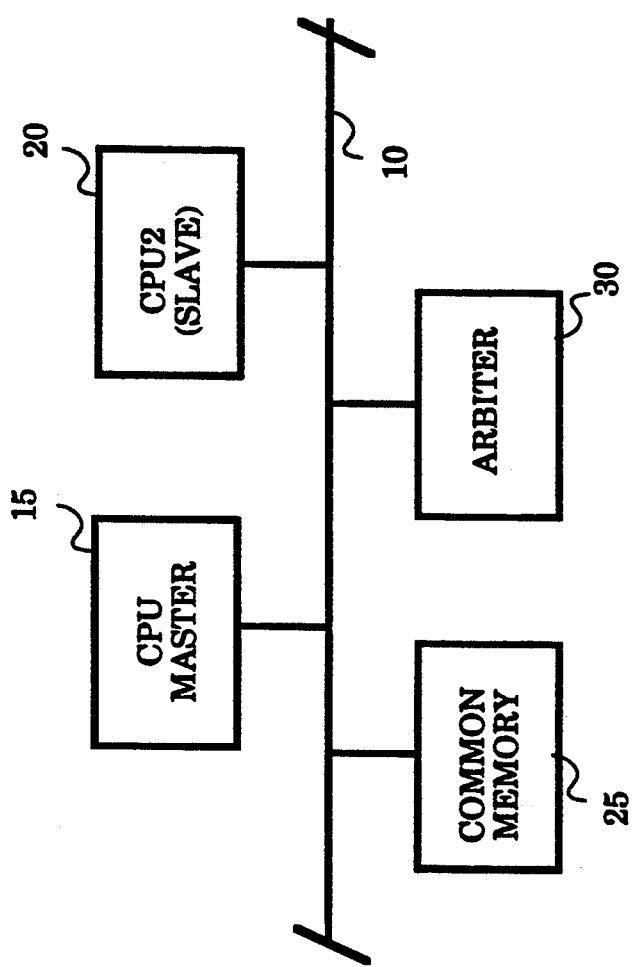
FIG. 1 is a block diagram of a prior microprocessor system.
Figure 2:
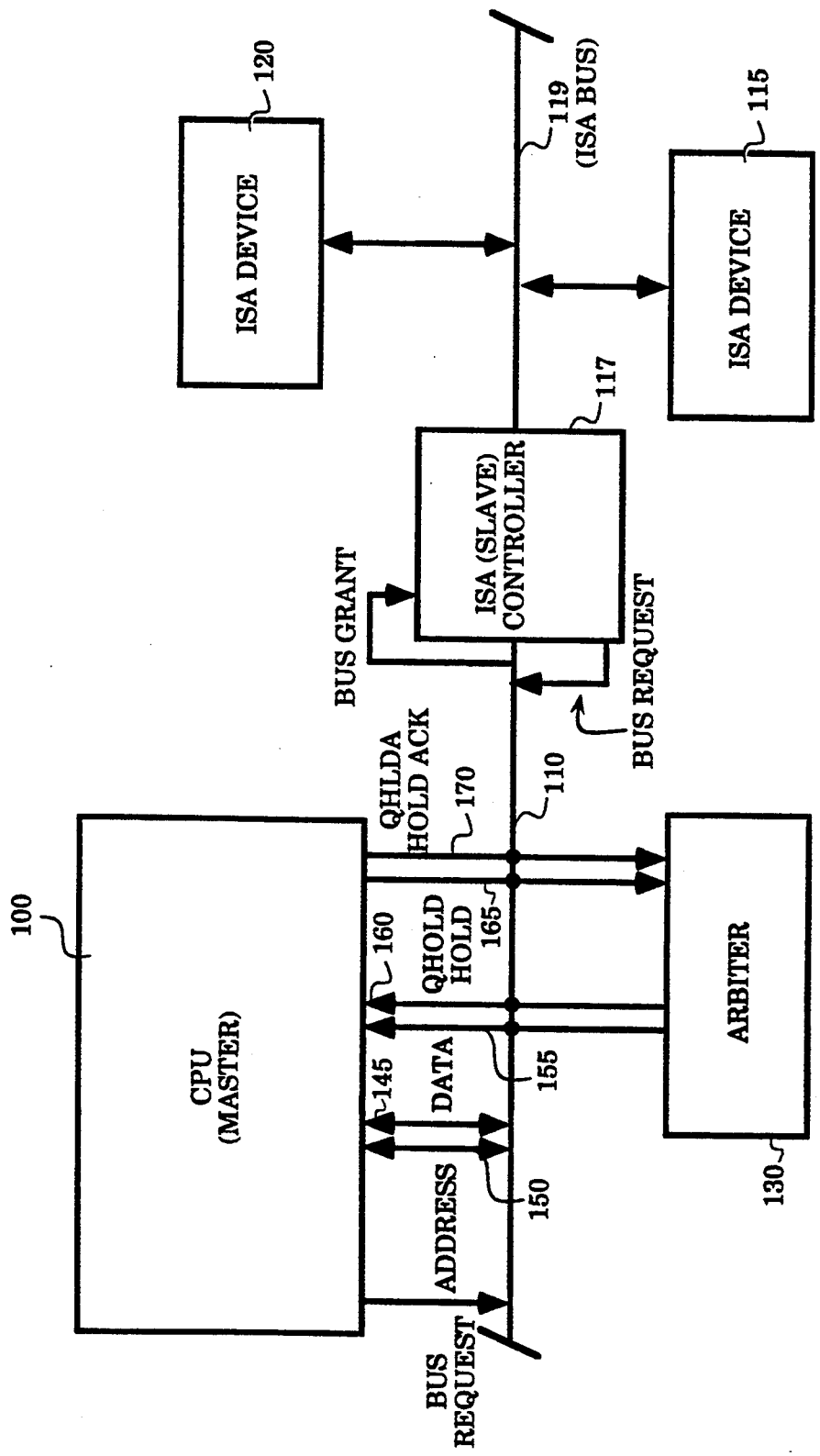
FIG. 2 is a simplified block diagram of a system incorporating the protocol of the present invention.

A simplified block diagram of the system incorporating the dual hold protocol is shown in FIG. 2. Device master 100, such as a central processing unit (CPU), is coupled to a bus 110 to which a bus arbiter 130 is connected. In the present embodiment, slave devices 115, 120 are also connected via ISA controller 117 and ISA bus 119. The ISA controller 117 issues bus request signals and receives bus grant signals on behalf of the devices 115,120. For purposes of simplifying the description of the protocol, the devices 115, 120 and controller 117 will be generally referred to as a slave device. Furthermore it is apparent that the invention includes slave devices which are coupled to the bus 110 or to other busses.

The arbiter 130 controls access to the bus 110 by issuing a number of signals; however, focus will be on the HOLD signals 135, 140 issued in accordance with the present invention. Similarly, the CPU 100 issues and receives a multiplicity of signals across the bus including data 145, address 150, and the HOLD signals 155, 160, 165, 170 employed in accordance with the teachings of the present invention.

Figure 3:
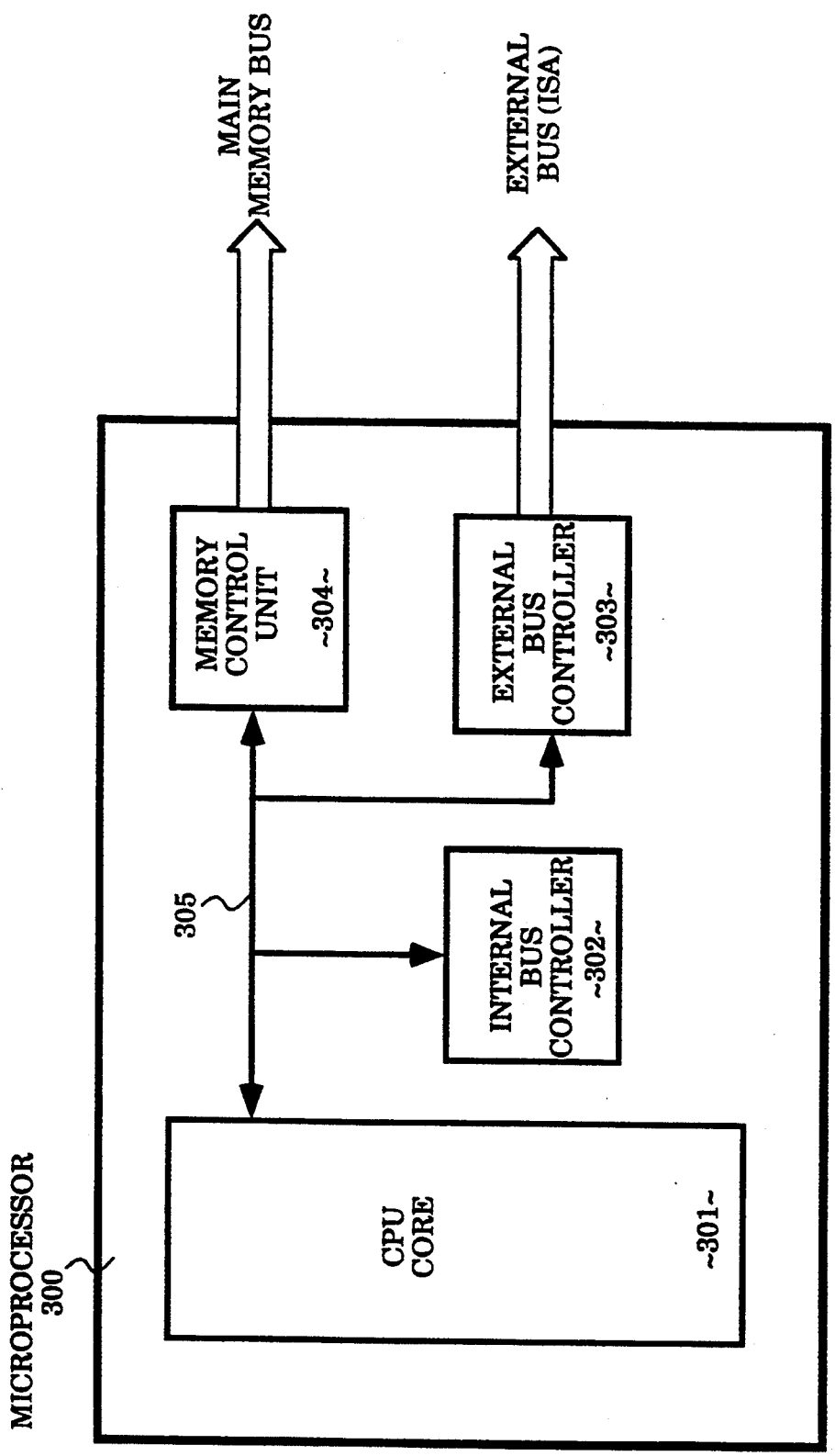
FIG. 3 is a simplified diagram of an exemplary microprocessor.

Referring to FIG. 3, a microprocessor 300 comprises internal bus 305 for communicating information within microprocessor 300, central processing unit (CPU) core 301 for processing instructions and data, internal bus controller (IBC) 302 for controlling communication over the internal bus 305, memory control unit (MCU) 304 for controlling accesses to main memory, and external bus or Industry Standard Architecture (ISA) controller (EBC) 303 for controlling communication between microprocessor 300 and the bus of the computer system. Each of the components is coupled to bus 305 which communicates information between each other. In the currently preferred embodiment, MCU 304 coordinates data transfers between CPU core 301 and the main memory, including the generation of addresses for burst transfers. Also, EBC 303 coordinates data transfers between CPU core 301 and devices on the external ISA bus.

The present invention supports different types of bus transfers. In the currently preferred embodiment, bus transfers can be single cycle or multiple cycle, burst or non-burst, cacheable or non-cacheable, and consist of 8-, 16- or 32-bit transactions. The type of bus transfers in microprocessor 300 are coordinated by the memory control unit, the external bus controller, the internal bus controller and the bus unit inside the CPU core.

Data transfers in microprocessor 300 are controlled by IBC 302. The signals generated by IBC 302 are sent to MCU 304 and EBC 303, which in turn provide access to the main memory bus and the external bus of the computer system, respectively. Thus, in this configuration, IBC 302, MCU 304 and EBC 303 are used to form the interface between microprocessor 300 and the remainder of the computer system.

In the currently preferred embodiment, MCU 304 runs DRAM cycles at relatively fast speeds (e.g., 25–33 MHz) while the EBC 303 runs all its cycles to the external or ISA bus at 8 MHz. By allowing the internal bus to run in pipelined mode, the reduction in overall system performance as a result of modules running at different speeds is mitigated. Since both burst and non-burst address pipelining is supported, a further balance is achieved in a system with both burst (MCU) and non-burst (EBC) modules present.

Figure 4:
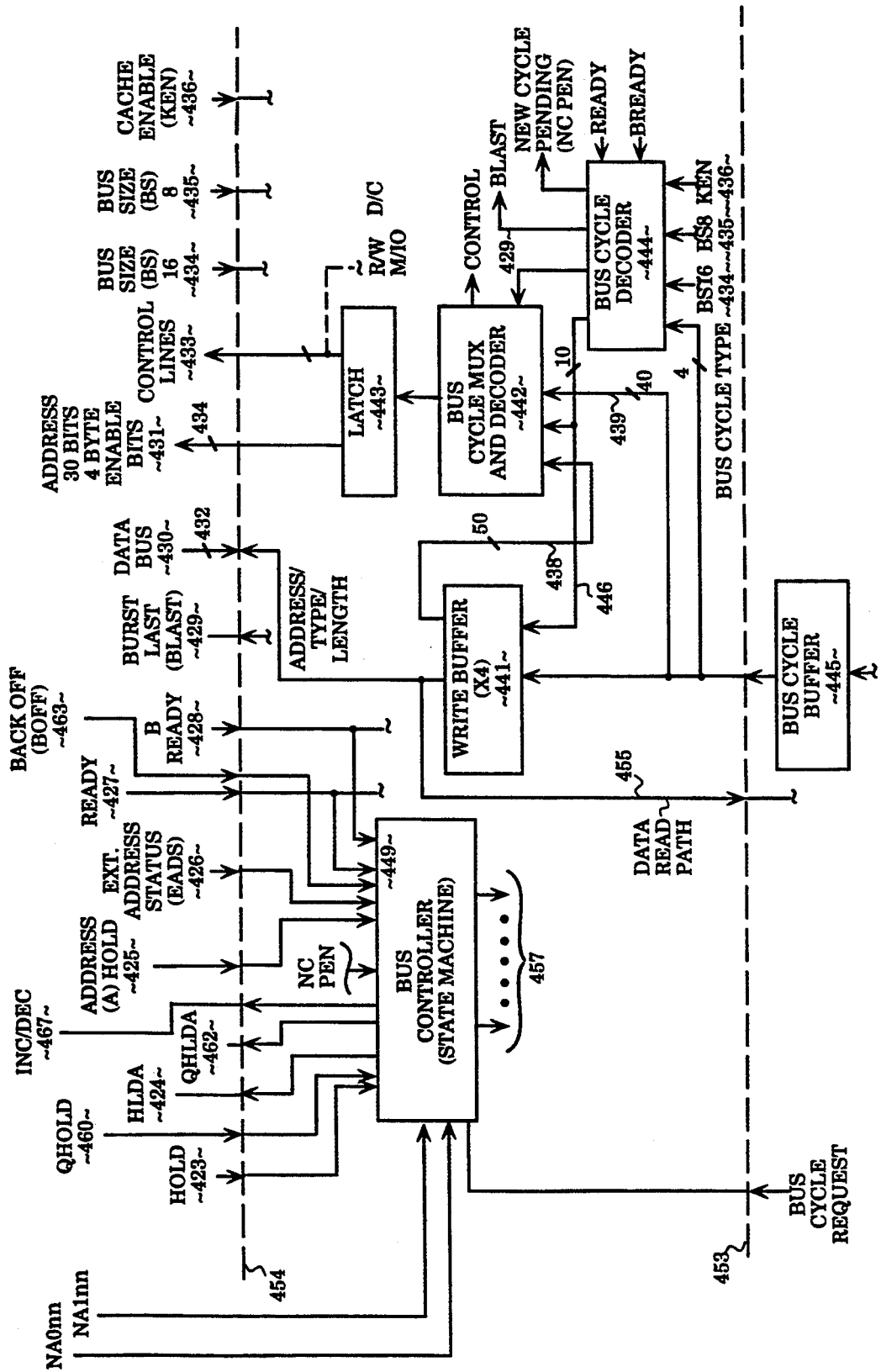
FIG. 4 is a more detailed view of a microprocessor and interface implementing the protocol of the present invention.

The major components of the CPU core's bus unit interface are shown in FIG. 4 between the dotted lines 453 and 454. All memory addresses, various control signals and all data to be read from or written to external memory are communicated to a bus interface (not shown) through the buffer 445. The output data of buffer 445 is coupled to the write buffer 441. This buffer is "4 deep", thus permitting data from buffer 445 for four CPU cycles to be temporarily stored in one of the four stages of the buffer 441. The output of the buffer 441 communicates directly with the data lines of the bus. Also stored in buffer 441 and associated with data stored in each of the four stages are signals representing the memory address, memory cycle type and length. The signals representing bus cycle type, etc., are coupled from the decoder 444 via lines 446 to the buffer 441 and to the bus cycle multiplexer and decoder 442.

The bus cycle multiplexer and decoder 442 selects either the address signals, bus type signals, etc., (i) from the buffer 441 (lines 438) or, (ii) directly from the buffer 445 (lines 439) and lines 446. The output of multiplexer and decoder 442 is coupled to the latch 443. The output of the latch provides the address signals (30 bits of address and 4 bits of byte enable signals) on bus and control lines for the memory.

Four bits from the buffer 445 are coupled to the bus cycle decoder 444 to indicate the type of bus cycle. These bits indicate up to 16 different types of bus cycles, such as memory read, memory write, and I/O read/write. The bus cycle type bits are decoded in decoder 444 and are used to control, for example, the multiplexer 442, and to provide certain outputs such as the "BLAST#" "HLDA" and "HOLD" signals which shall be discussed.

The bus controller 449, which is preferably a state machine, receives a bus cycle request signal on line 455 in addition to several other inputs which shall be described. The bus controller provides control signals on lines 457 to the various circuits in the bus interface unit including the bus cycle decoder 444, bus cycle multiplexer and decoder 442, latch 443 and buffer 441. In particular, the bus controller issues the HLDA and QHLDA signals. As will be explained, the HLDA and QHLDA respectively indicates an acknowledgment by the CPU of a HOLD and QHOLD request. Typically, the bus controller operates as an ordinary state machine.

The bus cycle decoder 444 provides the BLAST# signal (burst last, sometimes referred to as the last signal). The BLAST# signal indicates that a microprocessor data request (input or output) will be satisfied at the next ready signal on lines 427 or 428.

The major external inputs to the bus interface unit and the major outputs (to external circuitry) from the processor are shown in FIG. 4 along line 454. The data bus 320 is a 32-bit bi-directional bus. The microprocessor provides a memory address on the address bus. This address consists of 30 bits of address signals and four byte enable bits. Three control lines indicate read/write to memory or an input/output device and data vs. control (for example, prefetch from memory vs. data read). The address status (ADS#) is an active low signal on line 422 indicating that the address on the bus is valid.

The memory cycle requests by the microprocessor generally require 32 bits of data read from memory or written to memory. In some cases, the memory may be limited to an 8-bit or 16-bit bus. If this is the case, the memory provides an appropriate signal on lines 434 or 435. The signal on line 435 (bus size 8) indicates that the transfer will be satisfied with eight bit transfers whereas the signal on line 434 (bus size 16) indicates that the request will be satisfied with 16 bit transfers. Lines 434 and 435 are coupled to the bus cycle decoder 444 and their use, particularly for the generation of the BLAST# signal on line 429, shall be discussed later in the application.

The input on line 423 is an ordinary "HOLD" signal and the output on line 424 is a HLDA. The input signal on line 425 (address hold) indicates that the external address bus is to be immediately floated (1 clock cycle later). This is done to support cache snooping/invalidation. Line 426 provides an external address status. Lines 427 and 428 receive a ready (RDY#) signal and a burst ready (BRDY#) signal, respectively. These signals are also coupled to the bus cycle decoder 444.

The microprocessor is responsive to a bus backoff signal (BOFF#) 463. The bus backoff signal is input to the microprocessor. In response to the BOFF# signal, the microprocessor aborts all bus cycles and floats its bus address and data pins in the next clock cycle to relinquish bus ownership. The microprocessor typically floats all pins floated during a bus hold but the HLDA signal is not asserted. BOFF# has a higher priority than RDY# or BRDY#; if both are returned in the same clock, BOFF# takes effect and the data ready on the buses lost (therefore, subsequently a bus cycle must be reissued in order to access the data lost during BOFF#). The microprocessor remains in bus hold until BOFF# is deasserted.

Bus controller 449 also receives two signals, NA0nn and NA1nn ("NA" representing "next address") from the internal bus controller 302. The NA0nn and NA1nn pins are used to facilitate address pipelining during data transfers. Address pipelining allows bus cycles to be overlapped, increasing the amount of time available for the memory or input/output (I/O) devices to respond. This capability permits peripheral modules to run in parallel because the next bus cycle is allowed to begin before the current bus cycle is complete.

More particularly, the NA0nn and NA1nn pins are used to request the next non-burst and burst address respectively. The IBC 302 decides which of the two inputs to assert on a cycle-by-cycle basis. When an address is asserted on the internal address bus of the microprocessor, IBC 302 determines whether the address is for main memory or whether the address is for a device coupled to the external (ISA) bus of the computer system. If the address is to main memory, to and from which burst data transfers are run, then IBC 302 activates the NA1nn pin. The activating of the NA1nn pin will initiate the next pending burst request within the CPU core to be driven out on to the address bus (ADS# asserted) while continuing to allow data transfer(s) for the current bus cycle to occur. If the address is to a device, to and from which non-burst data transfers are run, then IBC 302 activates the NA0nn pin. Activating the NA0nn pin will initiate the next pending non-burst request within the CPU core to be driven out on to the address bus (ADS# asserted) while continuing to allow data transfer(s) for the current bus cycle to occur.

In the currently preferred embodiment, a bus cycle is at least two clocks long and begins with ADS# active in the first clock and RDY# active in the last clock. Data is transferred to and from the microprocessor during a data cycle. A bus cycle contains one or more data cycles.

Typically, a non-burst single bus cycle transfer is two clocks long. The transfer can be either a read or write. The microprocessor initiates a cycle by asserting the address status signal, ADS#, at the rising edge of the first clock. The ADS# signal output indicates that a valid bus cycle definition and address are available on the cycle definition lines and address bus. The non-burst ready input RDY# is returned by the external system in the second or subsequent clocks. The RDY# indicates that the external system has presented valid data on the data pins in response to a read or the external system has accepted data in response to a write. The microprocessor samples the RDY# signal at the end of the second and every subsequent clock until RDY# is active. The cycle is complete if the RDY# signal is active (i.e., low) when sampled.

To implement burst cycles, the burst ready (BRDY#) pin is used. This pin indicates a burst ready to the microprocessor. When returned in response to a burstable cycle, the microprocessor expects that the external memory system is performing a burst transfer.

The fastest burst cycle possible requires two clocks for the first data item to be returned to the processor with subsequent data items returned every clock. Burst cycles need not return data on every clock. The microprocessor will only strobe data into the chip when either RDY# or BRDY# are active. Thus, BRDY# need not be generated every clock for burst operations. During each part of the burst transfer, the BLAST# pin indicates whether the burst will end on the next ready signal. If BLAST# is driven active in the clock that BRDY# is returned, the burst transfer has completed, and the microprocessor will either proceed with a new bus cycle, or the bus will go idle. BLAST# is typically sampled by the bus controller only in the second and subsequent clocks when RDY# or BRDY# is returned.

The non-burst ready input RDY# is returned by the external system in the second or subsequent clocks. To reiterate, the RDY# indicates that the external system has presented valid data on the data pins in response to a read or the external system has accepted data in response to a write. The CPU core 301, via IBC 302, samples the RDY# signal at the end of the second and every subsequent clock. The cycle is complete if the RDY# signal is active (i.e., low) when sampled.

When performing pipelined burst transactions, the microprocessor initiates a cycle by asserting the address status signal, ADS#, at the rising edge of the first clock and generates the address for the bytes to be transferred in the burst cycle. The burst ready input BRDY# is returned by the external system in the second or subsequent clocks. The microprocessor samples the BRDY# signal at the end of the second clock and every subseqent clock till BRDY# and BLAST# are active. Data DATA1, corresponding to the initial address, ADDR1, is strobed into the microprocessor when BRDY# is active low. The addresses of the remaining data items of the burst request, DATA-DATA4, are then generated by MCU 304 onto the memory address bus of the computer system. The data corresponding to each address, DATA-DATA4, are then strobed into the CPU every clock BRDY# is sampled to be active low. If a request for another burst data transfer occurs before the BRDY# signal is sampled for the last 4 bytes of data, then the next address will be driven onto the address lines simultaneously to the transferring of the data from the previous address. In this manner, the address can be pipelined, such that the BRDY# signal can be asserted and the data for the next transfer can be ready at the clock after the last BRDY# of the previous cycle, such that the latency is eliminated. As is apparent, this will only allow the HOLD signal to be responded to once all data transfers in response to outstanding addresses have been completed.

As noted above, the address pipelining capability and burst transaction capability increases the latency in responding to hold requests issued by the arbiter. For time constrained bus requests, a second signal, referred to as QHOLD, and corresponding protocol have been developed. Preferably, when a device issues a request to access the bus to the arbiter, the arbiter determines whether the response required has time constraints to be addressed. Preferably, the decision whether to utilize the high latency HOLD/HLDA protocol or lower latency QHOLD/QHLDA is indicated by a programmable bit controlled by the BIOS of the microprocessor. A variety of factors can be examined to determine which hold protocol to use. For example, the clock frequency of operation, the wait states of memory, device tolerances (e.g., DRAM refresh rate) as well as other factors can be considered. The factors considered are implementation specific and dependent upon the BIOS code. If the bus request requires prompt servicing, the arbiter issues a QHOLD signal to the microprocessor through QHOLD signal line 465. The bus controller of the microprocessor, upon receipt of the QHOLD signal, will cease issuing pipelined addresses on the bus. In addition, if currently a burst address is out on the bus, the microprocessor will issue a signal BLAST# on signal line 429 to indicate that the current data ready on the bus is the last of the data even if additional data were to be transacted during subsequent clock cycles. The BLAST# signals tell the peripherals coupled to the bus that the next time BRDY# is returned, the bus cycle is complete. Thus, the peripherals enter the proper state to react to the release of the bus by the microprocessor. Non-burst cycles are ended after the next RDY# signal is issued irrespective of the fact that the cycle is part of a multi-cycle non-burst transfer (BLAST# inactive) or a single cycle (BLAST# active).

The microprocessor further includes control logic to subsequently issue addresses for the remaining data not transacted due to the premature issuance of the BLAST# signal. The address(es) are preferably issued once the microprocessor has regained access to the bus.

Figure 5:
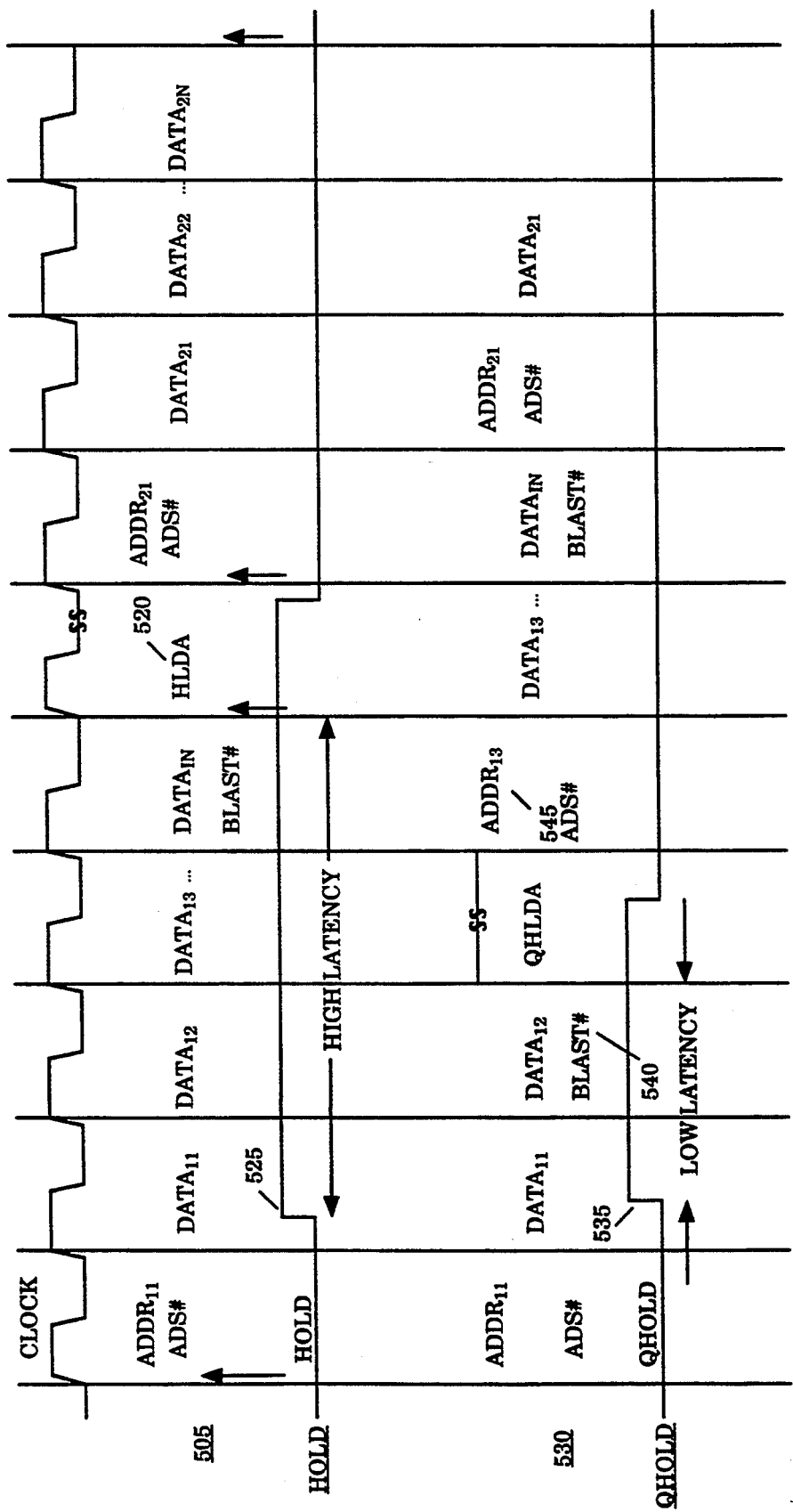
FIG. 5 is a timing diagram illustrating the timing advantages gained using the protocol of the present invention.

This is illustrated in the simplified timing diagram of FIG. 5. The first waveform 505 show the issuance of a burst address $ADDR_{11}$ and the data transfer responsive to the address $DATA_{11} DATA_{12} \ldots DATA_{1N}$, before receipt of the hold request signal HOLD and issuance of the hold acknowledge signal HLDA 520. This timing occurs regardless that the hold request was issued a number of clock cycles earlier, at point 525. However, a lower latency is incurred using the QHOLD protocol as illustrated by waveform 530. During the clock cycle 540 after the issuance of the QHOLD signal (535), the BLAST# signal is asserted to prematurely terminate the burst cycle without causing the peripherals to respond to an aborted cycle. The peripherals see the BLAST# signal and assume it is the normal end of the burst cycle. The next cycle the QHLDA signal is asserted and the microprocessor relinquishes the bus. Subsequently, the microprocessor is able to again gain access to the bus. At that time 545, a burst address $ADDR_{13}$ requesting the remaining data not transferred due to the earlier premature termination of the burst cycle is initiated.

If at the time the QHOLD signal is issued a plurality of addresses have been pipelined on the bus, the microprocessor must preferably wait until all but the last bus cycle is complete before responding to the QHOLD signal (i.e., the bus is non-pipelined). If the addresses include burst addresses and the last address issued corresponds to a burst transfer, the number of clock cycles of the delay before responding can be shortened by issuing the BLAST# signal after the first block of data has been received for the last of the pipelined addresses. Alternatively, the delay can be further decreased by issuing a BLAST# signal after the first block of data has been received for each burst request of the pipelined addresses, this at the cost of the microprocessor having to save the address and data for multiple cycles prematurely terminated instead of just the address and data of the last cycle.

Referring to FIG. 4, the microprocessor further issues an internal backoff signal which internally stops issuance of bus cycles and issues a quick hold acknowledge signal (QHLDA) over signal line 462 to the arbiter. The internal backoff signal causes the microprocessor to wait to issue subsequent bus cycles until the microprocessor gains control of the bus again, either by waiting for the device which has requested the bus to complete its bus cycles or by subsequently issuing a bus request. The arbiter, upon receipt of the QHLDA signal, issues a bus grant signal to the device which requested access to the bus, whereby the device can gain access to the bus in a relatively short period of time. Subsequently, when the microprocessor regains access to the bus, the aborted bus cycles containing the addresses of data transfers to be performed are reissued wherein normal processing continues.

Figure 6:
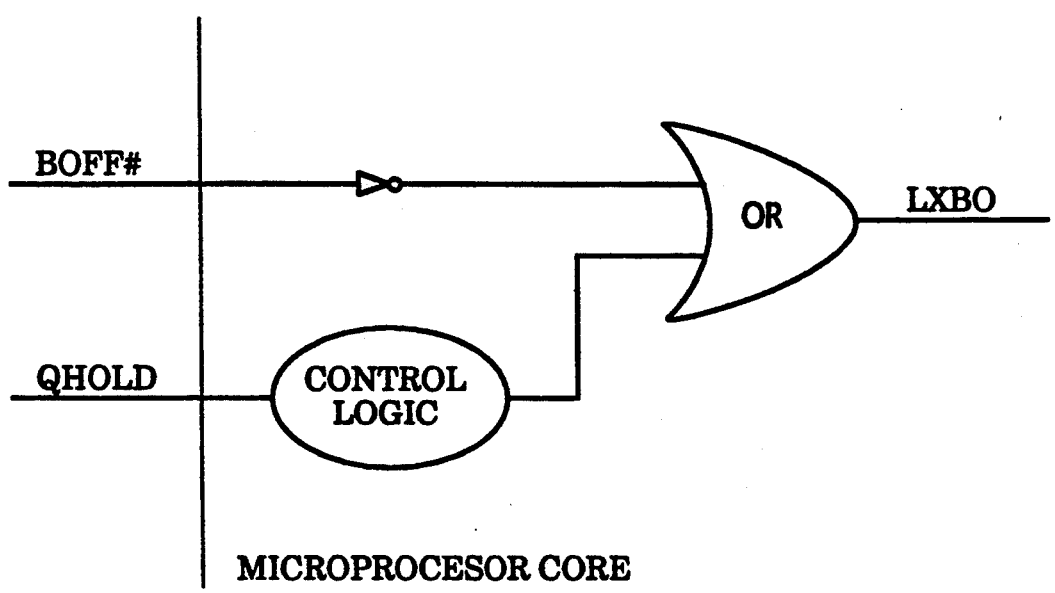
FIG. 6 is a simplified block diagram of the internal backoff mechanism utilized in the present embodiment.

The internal backoff signal is responsive to the QHOLD signal and results in the microprocessor performing a backoff similar to the backoff performed in response to a BOFF# signal. This signal is asserted internally to the microprocessor and does not affect the state of the other devices coupled to the bus. Furthermore, as shown in FIG. 6, prior to coupling to an interna; backoff signal (LXBO), the control logic waits to assert a signal until the bus is in a proper state such that the backoff of the microprocessor does not cause a disruption on the bus. Preferably, the control logic waits for a ready signal to appear on the bus prior to asserting a signal on LXBO.

In addition, to the QHOLD and QHLDA pins, it is preferred that the microprocessor further includes the INC/DEC# pin for use in the QHOLD protocol. Typically, based upon the address of the bus, when ADS# is asserted, the responding device can predict the next 3 addresses of data of a burst cycle, more particularly, whether to increment or decrement from the transmitted address to determine subsequent addresses. For example, in the i486, if the least significant address bits, i.e., $ADDR_{0-3}$ of the burst address transmitted is zero, the sequence of addresses is 0, 4, 8, C. If the burst address ends in a value of four, the sequence is 4, 0, C, 8. It follows that if the address ends in eight or C, the sequence is 8, C, 0, 4, and C, 8, 4, 0, respectively.

If QHOLD is asserted during a burst cycle, for example, 0, 4, 8, C, and is prematurely terminated after data at the 0 address is transmitted, it is desirable that the data at locations 4, 8, C are subsequently transmitted. However, if a later burst cycle is initiated to access the remaining data at locations 4, 8, C and the address transmitted is 4, the responding device would typically assume that data at addresses 4, 0, C, 8 should be transmitted instead of the desired 4, 8, C. To overcome this problem, the INC/DEC# pin is used to indicate whether the subsequent addresses should be determined by incrementing or decrementing the transmitted address. This pin is controlled by the microprocessor and monitored by the responding devices. Other alternatives are also feasible. For example, the peripheral devices may be configured with control logic to maintain prior states to eliminate the need for the INC/DEC# signal. However, additional logic at each of the devices would be required to control this function.

Therefore, a dual hold protocol is provided which enables switchable low latency and high latency responses to hold requests to be performed based upon the state of the bus, the microprocessor and the device. Furthermore, an innovative structure and method for permitting low latency access to the bus in a graceful manner without requiring peripheral devices to respond to backoff signals is provided. Although the invention has been described in conjunction with the preferred embodiment, it is evident that numerous alternatives, modifications, variations and uses will be apparent to those skilled in the art in light of the foregoing description.

What is claimed is:

1. A system comprising:
   a bus;
   a master device coupled to the bus, said master device having priority of access to the bus and issuing burst addresses for data operations wherein in response to a burst address, a plurality of data cycles transferring data are executed to complete the burst transaction and bus cycle;
   at least one slave device coupled to the bus, said slave device gaining access to the bus by issuing a bus request and receiving a bus grant signal;
   a bus arbiter coupled to a bus, said arbiter arbitrating device access to the bus according to bus requests received, said bus arbiter issuing a QHOLD signal to the master device when a slave device requests access to the bus;
   said master device, upon receipt of the QHOLD signal, if burst addresses have been issued on the bus and burst transactions are incomplete, issuing a BLAST# signal indicating to said at least one slave device coupled to the bus that the burst transaction is complete, executing an internal backoff to release the bus once the bus cycles are complete and issuing a QHLDA signal to the arbiter indicating that the QHOLD request is acknowledged and the slave device can have access to the bus;
   wherein the arbiter issues a bus grant signal to the slave device and the slave device quickly gains access to the bus.

2. The system as set forth in claim 1, wherein the master device further has the capability to issue pipelined addresses for data operations wherein a plurality of addresses are issued on the bus without waiting for data responsive to the addresses to be received prior to issuing subsequent addresses, wherein said master device issuing a BLAST# signal for each burst address issued to prematurely terminate the burst bus cycles, said master device performing an internal backoff once the bus cycles are complete.

3. The system as set forth in claim 1, wherein the master device further has the capability to issue piplined addresses for data operations wherein a plurality of addresses are issued on the bus without waiting for data reponsible to the addresses to be received prior to issuing subsequent addresses, wherein said master device issues a BLAST# signal for the last pipelined burst address issued to prematurely terminate the last burst bus cycles, said master device performing an internal backoff once the bus cycles are complete.

4. The system as set forth in claim 1, wherein the internal backoff is controlled by receipt of the QHOLD signal by the master device an internal control logic, said control logic receiving the QHOLD signal and waiting until the bus cycles are complete before issuing a signal to execute an internal backoff of the bus.

5. The system as set forth in claim 1, wherein said system implements a dual hold protocol,
   said arbiter further selectively issuing a hold signal HOLD to the master device when a non-time critical access to the bus is requested by a slave device and selectively issuing a QHOLD signal when a time critical access to the bus is requested by a slave device;
   said master device, if a HOLD signal is issued, waiting until completion of outstanding bus cycles prior to releasing the bus and issuing a hold acknowledge "HLDA" signal to the arbiter to indicate that the bus is available for access by the requesting device.

6. The system as set forth in claim 5, wherein said arbiter further comprises means for determining whether a bus access request received from a device is time critical.

7. The system as set forth in claim 1, said master device, during a subsequent access to the bus, issuing addresses for data operations to transact data not transacted previously due to issuance of the BLAST# signal to terminate burst transactions.

8. The system as set forth in claim 7, further comprising an increment/decrement signal to indicate whether subsequent addresses of data to be transacted in response to a burst address issued are determined by incrementing or decrementing the burst address issued, wherein responding devices to addresses issued for data operations to transact data not transacted previously due to issuance of the BLAST# signal to terminate burst transactions, provide the data requested.

9. The system as set forth in claim 8, wherein the master device issues the increment/decrement signal.

10. The system as set forth in claim 1, wherein the master device comprises a central processing unit.

11. The system as set forth in claim 1, wherein at least one slave device comprises memory.

12. A bus system for interconnecting a plurality of devices via a bus, said system comprising:
an arbiter coupled to the bus for arbitrating requests for access to the bus by the plurality of devices, said arbiter comprising means for issuing a first hold signal "QHOLD" to a device currently accessing the bus when another device issues a request to access the bus;
a master device comprising;
means for initiating bus burst cycles by issuing a burst address on the bus to a slave device, said slave device responding by providing a plurality of data elements located at sequential addresses to the burst address, and
means responsive to the QHOLD signal comprising;
means for issuing a burst last signal "BLAST#" on the bus for burst cycles outstanding on the bus, said BLAST# signal prematurely terminating a burst cycle by notifying the slave device that the last data element provided completes the burst cycle, thereby decreasing the latency incurred until the end of the bus cycle is reached,
means for executing an internal backoff of the master device from the bus, said means for executing an internal backoff receiving the QHOLD signal and executing the internal backoff once outstanding bus cycles are complete, and
means for issuing a first hold acknowledge "QHLDA" signal to the arbiter to notify the arbiter that the bus is released for access by the requesting device;
wherein the bus is released for access by the master device with the minimal of latency in a manner transparent to the slave devices.

13. The system as set forth in claim 12, wherein: the arbiter further comprises;
means for issuing a second hold signal "HOLD" to a device currently accessing the bus when another device issues a request to access the bus,
selection means for selecting the QHOLD or HOLD signal to issue when a request by a device to access the bus is received, said means selecting the QHOLD signal if low latency is required; and said master device further comprises;
means responsive to the HOLD signal comprising,
means for polling for the existence of a HOLD signal at the completion of outstanding bus cycles,
means for releasing the bus for access, and
means for issuing a second hold acknowledge signal
"HLDA" to notify the arbiter that the bus is released and available for access by the requesting device;
wherein the first hold signal is selectively issued by the arbiter when the requesting device requires access to the bus in a short amount of time.

14. The system as set forth in claim 12, wherein said master device further comprises means for issuing addresses to transact data of data operations prematurely terminated by issuance of the BLAST# signal in response to the QHOLD signal once the master device has regained access to the bus, wherein the master device accesses data not accessed previously due to premature termination of bus cycles.

15. The system as set forth in claim 12, wherein the master device further has the capability to issue pipelined addresses for data operations wherein a plurality of addresses are issued on the bus without waiting for data responsive to the addresses to be received prior to issuing subsequent addresses, wherein said master device issuing a BLAST# signal for each burst address issued to prematurely terminate the burst bus cycles, said master device performing an internal backoff once the bus cycles are complete.

16. The system as set forth in claim 12, wherein the master device further has the capability to issue pipelined addresses for data operations wherein a plurality of addresses are issued on the bus without waiting for data responsive to the addresses to be received prior to issuing subsequent addresses, wherein said master device issues a BLAST# signal for the last burst address issued to prematurely terminate the last burst bus cycles, said master device performing an internal backoff once the bus cycles are complete.

17. The system as set forth in claim 12, wherein the means for executing an internal backoff comprises means for receiving the QHOLD signal and control logic means, said waiting until outstanding bus cycles are complete before issuing a signal to execute an internal backoff of the bus.

18. The system as set forth in claim 13, wherein said arbiter further comprises means for determining whether a bus access request received from a device requires a low latency response.

19. The system as set forth in claim 14, further comprising an increment/decrement signal to indicate whether subsequent addresses of data to be transacted in response to a burst address issued are determined by incrementing or decrementing the burst address issued, wherein responding devices to addresses issued for data operations to transact data not transacted previously due to issuance of the BLAST# signal to terminate burst transactions, provide the data requested.

20. The system as set forth in claim 19, wherein the master device further comprises means for issuing the increment/decrement signal.

21. The system as set forth in claim 12, wherein the master device comprises a central processing unit.

22. The system as set forth in claim 12, wherein at least one slave device comprises memory.

23. In a system comprising a master device, at least one slave device and a bus arbiter coupled to a bus, said arbiter arbitrating device access to the bus, said master device having priority of access to the bus, a process for quickly providing bus access to slave devices, comprising the steps of:

(a) selectively issuing a first hold "QHOLD" signal to the master device;

(b) upon receipt of the QHOLD signal;
  if at least one burst transaction is pending on the bus, then
  (i) issuing a burst last "BLAST#" signal to indicate to the slave devices that the burst cycle is complete, said BLAST# signal functioning to prematurely terminate access to the bus, and
  (ii) issuing a first hold acknowledge "QHLDA" signal to the arbiter;

(c) when outstanding bus cycles are complete, issuing an internal backoff signal within the master device, said internal backoff signal causing said master device to release the bus; and (d) upon receipt of the QHLDA signal, said arbiter granting the slave device ownership of the bus;

(e) wherein bus ownership by the master device is quickly released.

24. The method as set forth in claim 23, further comprising the step of when access to the bus is subsequently gained by the master device, issuing at least one address to initiate a bus transaction to transact data not earlier transacted due to premature termination of a burst cycle wherein the prematurely terminated burst cycle is subsequently completed.

25. The method as set forth in claim 23, further comprising the steps of:
  selectively issuing a second hold signal "HOLD" when low latency access by the requesting device is not required;
  said master device polling for the HOLD signal at the completion of outstanding bus cycles;
  upon detection of the HOLD signal, said master device releasing the bus and issuing a second hold acknowledge "HLDA" signal to indicate that the bus is available for access;
  upon receipt of the HLDA signal, granting the requesting slave device ownership of the bus.

26. The method as set forth in claim 24, further comprising the step of determining whether the requesting device requires quick access to the bus and causing the first hold signal to be issued if quick access is required.

27. The method as set forth in claim 23, further comprising the step of issuing an increment/decrement signal to indicate whether subsequent addresses of data to be transacted in response to a burst address issued are determined by incrementing or decrementing the burst address issued, wherein responding devices to addresses issued for data operations to transact data not transacted previously due to issuance of the BLAST# signal to terminate burst transactions, provide the data requested.

28. The method as set forth in 23, wherein the master device further has the capability to issue pipelined addresses for data operations wherein a plurality of addresses are issued on the bus without waiting for data responsive to the addresses to be received prior to issuing subsequent addresses, said step of issuing a burst last signal comprises the steps of issuing a BLAST# signal for each burst address issued to prematurely terminate burst bus cycles.

29. The method as set forth in claim 23 wherein the master device further has the capability to issue pipelined addresses for data operations wherein a plurality of addresses are issued on the bus without waiting for data responsive to the addresses to be received prior to issuing subsequent addresses, said step of issuing a burst last signal comprises the steps of issuing a BLAST# signal for the last burst address issued to prematurely terminate the last burst bus cycles.

* * * * *

UNITED STATES PATENT AND TRADEMARK OFFICE
CERTIFICATE OF CORRECTION

PATENT NO.   :   5,398,244
DATED        :   March 14, 1995
INVENTOR(S)  :   Mathews et al.

It is certified that error appears in the above-identified patent and that said Letters Patent is hereby corrected as shown below:

In column 7, at line 24, delete "DATA-DATA4" and substitute --DATA2-DATA4--.

In column 7, at line 27, delete "DATA-DATA4" and substitute --DATA2-DATA4--.

In column 9, at lines 9-10 delete "interna;" and substitute --internal--.

Signed and Sealed this

Twenty-ninth Day of October 1996

*Attest:*

BRUCE LEHMAN

*Attesting Officer*       *Commissioner of Patents and Trademarks*